United States Patent
Dauerer

[11] Patent Number: 6,115,928
[45] Date of Patent: Sep. 12, 2000

[54] FIBER OPTIC POSITION INDICATOR USING LIQUID/AIR LIGHT TRANSMISSION

[75] Inventor: Norman J. Dauerer, Hopewell Junction, N.Y.

[73] Assignee: International Business Machines Corporation, Armonk, N.Y.

[21] Appl. No.: 09/099,285

[22] Filed: Jun. 18, 1998

[51] Int. Cl.[7] .................................................. G01C 9/32
[52] U.S. Cl. ........................................ 33/348; 33/348.2
[58] Field of Search ................................ 33/348, 348.2

[56] References Cited

U.S. PATENT DOCUMENTS

| | | |
|---|---|---|
| D. 271,088 | 10/1983 | Ebner .................................. D10/69 |
| 4,407,075 | 10/1983 | MacDermott et al. ................ 33/348.2 |
| 4,484,393 | 11/1984 | LaFreniere ........................... 33/348.2 |
| 5,020,232 | 6/1991 | Whiteford ............................. 33/348.2 |
| 5,025,567 | 6/1991 | McWilliams et al. ................. 33/348.2 |
| 5,317,813 | 6/1994 | Reed ........................................ 33/348 |
| 5,894,672 | 4/1999 | Ellenburg et al. ....................... 33/265 |

Primary Examiner—Randy W. Gibson
Attorney, Agent, or Firm—Aziz M. Ahsan

[57] ABSTRACT

The present invention relates generally to a new fiber optic position indicator. More particularly, the invention encompasses a fiber optic position indicator that uses liquid/air light transmission. A method for making such a fiber optic position indicator is also disclosed.

38 Claims, 3 Drawing Sheets

FIBER OPTIC POSITION INDICATOR USING LIQUID/AIR LIGHT TRANSMISSION

FIELD OF THE INVENTION

The present invention relates generally to a new fiber optic position indicator. More particularly, the invention encompasses a fiber optic position indicator that uses liquid/air light transmission. A method for making such a fiber optic position indicator is also disclosed.

BACKGROUND OF THE INVENTION

Leveling devices have long been used by various users, such as, carpenters, brick-layers, plumbers, archers, hunters, to name a few. Each levelling device might be different, however, each level serves to find a horizontal line or plane by means of a bubble in a nonfreezing liquid, usually, mineral spirits, such that by adjustment of the horizontal movement of the bubble to the center of a glass tube that is slightly bowed up from the horizontal longitudinally, one can find a horizontal line or plane.

The leveling devices have also been used with other instruments, such as, sextants and octants, on artillery pieces, and on various industrial equipment, which must all be leveled, and reading the levelling device has sometimes been a most difficult problem.

Oftentimes, the levelling device or the equipment incorporating the leveling device is in an area which is provided with poor lighting, or the levelling is done during a time when natural lighting is poor.

The leveling devices are both manual and electronic, and the leveling devices are both illuminated and non-illuminated. However, this invention is directed to both illuminated and non-illuminated leveling device.

U.S. Pat. No. 4,407,075 (MacDermott) discloses a tubular-shaped spirit vial which is capable of being illuminated at its ends.

U.S. Pat. No. 4,484,393 (LaFreniere) discloses an illuminated spirit level, where a bubble tube is mounted in a support body with light source shielded to define two lights paths directed through the bubble tube to apertures on the outside of the support body so that with the bubble positioned centrally the light is communicated directly from the light source through the bubble tube to the apertures.

U.S. Pat. No. 5,025,567 (McWilliams) discloses an illuminated spirit level containing fiber optic cables for the transmission of light from the self contained light source to the level vials.

U.S. Pat. No. 5,020,232 (Whiteford) discloses a bubble vial of a carpenter's level that is individually illuminated by a light emitting diode (LED) energized from a battery supported with the body of the carpenter's level.

Thus there is a need for a more accurate mechanical leveling device.

PURPOSES AND SUMMARY OF THE INVENTION

The invention is a novel method and an apparatus for a fiber optic position indicator which uses liquid/air light transmission principles.

Therefore, one purpose of this invention is to provide an apparatus and a method that uses liquid/air light transmission principles to make a fiber optic position indicator.

Another purpose of this invention is to provide for a non-illuminated leveling device, that gets illuminated from ambient light.

Yet another purpose of this invention is to provide for an illuminated leveling device, that gets illuminated from a light source.

Therefore, in one aspect this invention comprises a leveling device, comprising:

(a) at least one see-through container containing at least one fluid, and (b) at least one fiber optic piece secured to said at least one see-through container.

In another aspect this invention comprises a method of making a leveling device, comprising securing at least one fiber optic piece to at least one see-through container containing at least one fluid.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION OF THE INVENTION

Figure 1A:
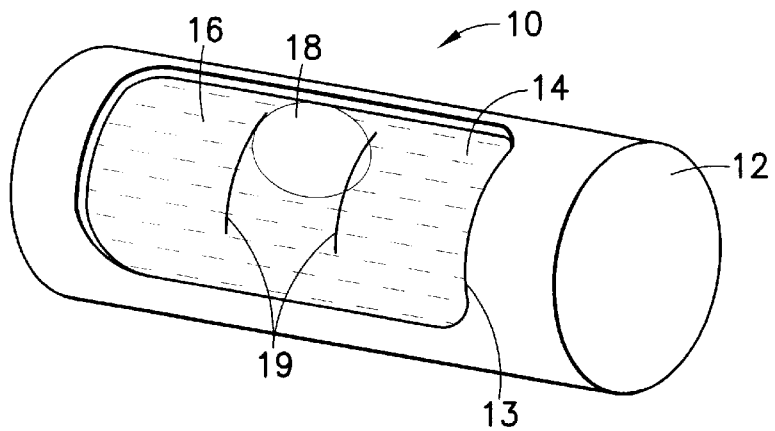
FIGS. 1A, 1B and 1C, illustrate a typical spirit level of the prior art.
Figure 1B:
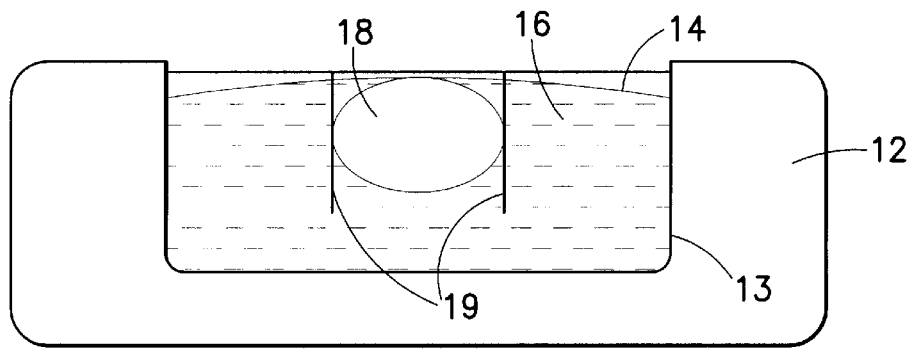
Figure 1C:
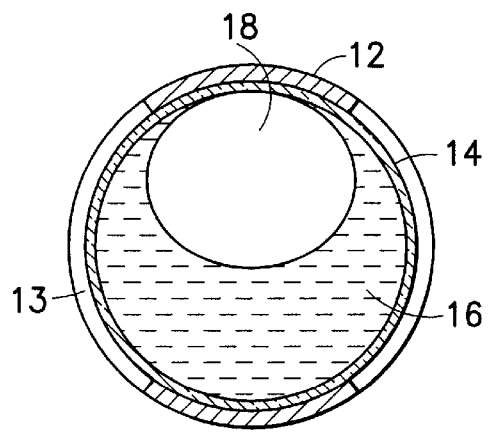

FIGS. 1A, 1B and 1C, illustrate a typical spirit level or a carpenter's level 10, of the prior art. The level 10, typically comprises of a housing 12, that contains a transparent tube 14. The tube 14, typically contains a non-freezing liquid 16, usually, mineral spirits 16, with a gas or air bubble 18. It is preferred that at least one of the non-freezing fluid 16, is selected from a group comprising alcohol, ethylene glycol, mineral spirit or water. However, one could also use at least one dye to give at least one of the fluid 16, some color. The tube 14, is preferably slightly bowed up from the horizontal longitudinally at the center, so that the bubble 18, moves to highest point within the tube 18, when it is in the center. This also helps in locating a horizontal line or plane by means of the bubble 18, such that by adjustment of the horizontal movement of the bubble 18, to the center of a tube 14, one can find a horizontal line or plane. The housing 12, has at least one window 13, so that one can see the movements of the bubble 18. The housing 12, or the tube 14, could have one or more alignment mark or indication 19. The alignment mark 19, helps as an indicator for centering or locating the bubble 18. Viewing the level 10, in less than favorable light conditions can make it difficult to discern the bubble 18, and its location.

Another problem that manifests itself with the level 10, is that if the viewer needs to concentrate his vision on a spot other than that of the level 10, he loses the ability to see if the object has gone out of level. This is even more pronounced if the level is part of another device, such as, for example, a gun sight, an archery device, etc.

To check the level of an object this invention could support the use of a sensor to provide an indication that the object has gone out of level. This could be used actively or passively, i.e., actions could be initiated to put the object back into level or it would be used to track how many times the object went out of level.

Figure 2A:
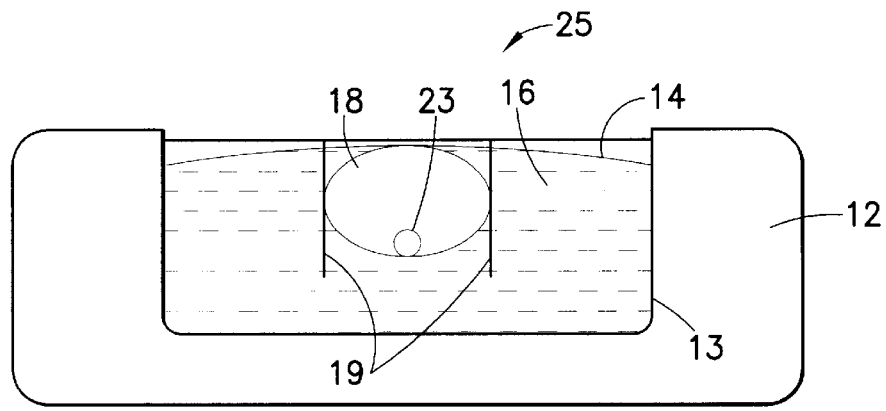
FIGS. 2A and 2b, illustrate one embodiment of this invention.
Figures 2B, 3B:
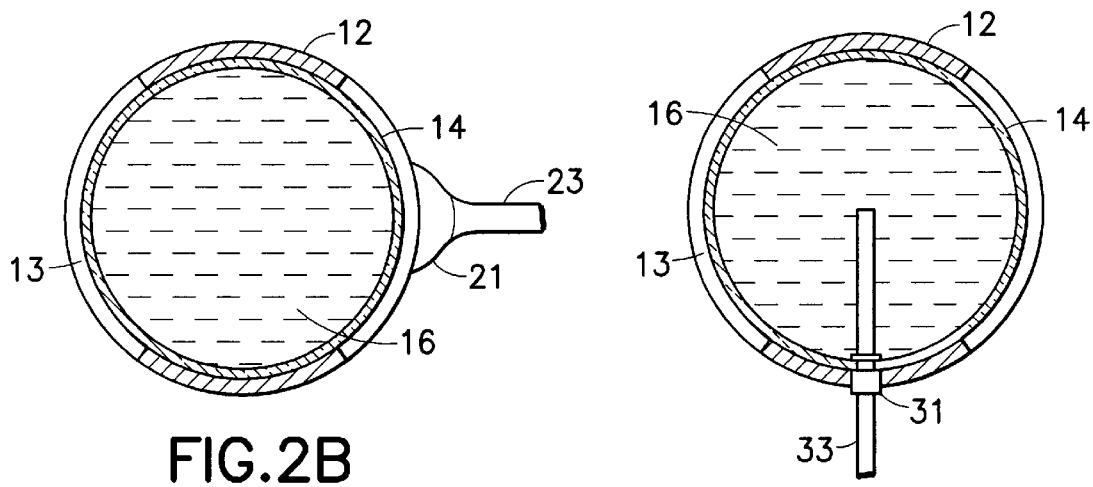
FIGS. 3A and 3B, illustrate another embodiment of this invention.

FIGS. 2A and 2b, illustrate one embodiment of this invention. A leveling device 25, has secured to it an optical fiber 23, using securing means 21. Thus by placing an optical fiber 23, a concentrated light source 23, becomes a colored point of light behind the level 25, one takes advantage of the properties of light, liquid and gas interaction.

The light diffusion within the liquid 16, enlarges the transmitted light from the optical fiber 23. What is viewed or sensed by a sensor, such as, a human eye, is a virtual 10-times version of the actual beam entering the liquid 16. On the other hand when the optic beam is viewed or sensed through the bubble 18, such as, an air bubble 18, within the level 25, it is reduced to it's actual size and seems to disappear in relative comparison to the transmitted-through-liquid version, see FIGS. 6 and 7.

Thus this invention provides several advantages. It allows the user to concentrate his vision away from the level 25, but still be aware of when the object of his concentration goes out of level.

However, if leveling is the only consideration then a light sensor, not shown, could discern when a variation occurs in the amount of transmitted light to indicate that an adjustment might be appropriate to level an object.

It is preferred that the fiber optic 23, is a fluorescent fiber optic, 23, and is placed in a central location of the transparent tube 14.

It is preferred that at least a portion of the see-through container 14, is transparent and is made from a material selected from a group comprising glass, plastic plexiglass, polyvinylchloride (PVC), to name a few. For ease of understanding the transparent container 14, maybe referred to as glass 14.

Figure 3A:
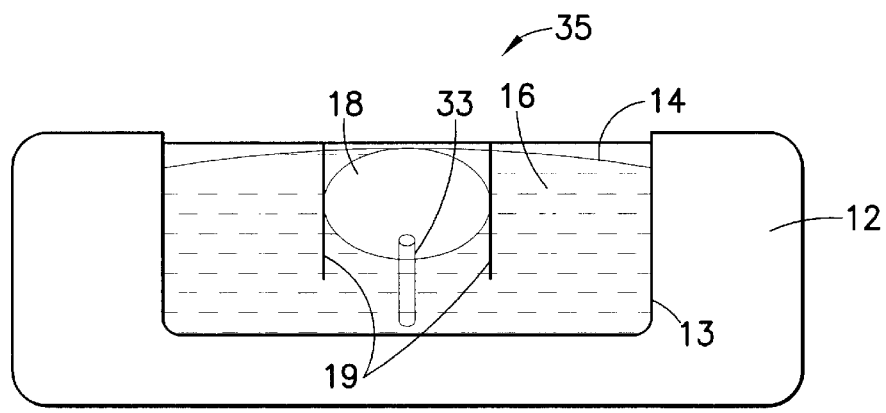

FIGS. 3A and 3B, illustrate another embodiment of this invention, where a fiber optic strand 33, such as, a fluorescent fiber optic strand 33, is placed inside the transparent tube 14, using a securing means 31.

Figure 4:
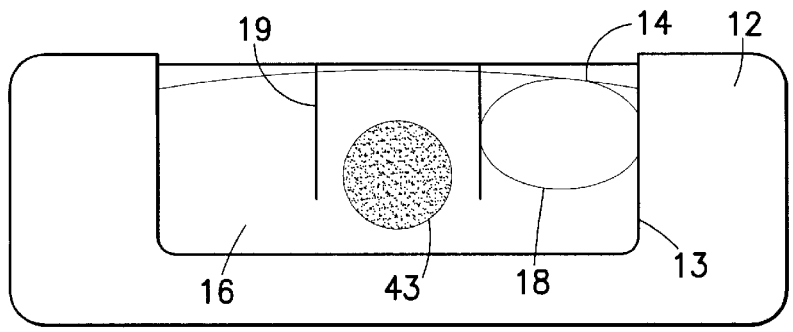
FIG. 4, is one illustration of using this invention.

FIG. 4, illustrates yet another embodiment of this invention, where a piece of an optical fiber 43, is placed at the exact location of where the bubble 18, would be properly centered. This would allow the most optimum leveling of the level of this invention.

Figure 5:
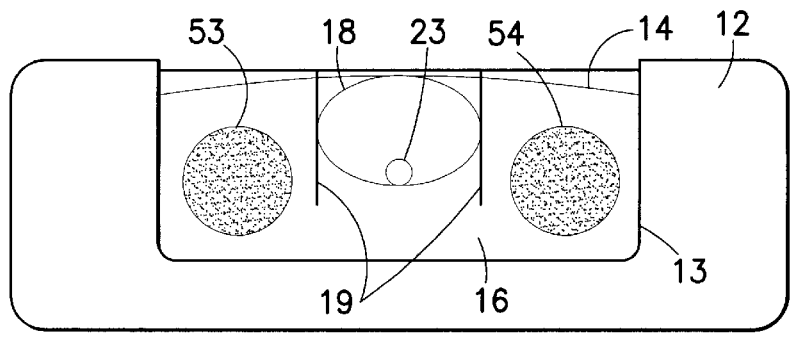
FIG. 5, illustrates yet another embodiment of this invention.

FIG. 5, illustrates yet another embodiment of this invention. Here one could use, for example, at least one fiber optic stem and maybe at least one light source, however, one could use multiple fiber optic stems and a plurality of light sources. This could be done by placing each of the items behind each marked section of a spirit level. This would allow for determining in which direction the level is tilted. One could use, for example, two bright lights 53 and 54, in combination with an optical fiber 23. The optical fiber 23, could be in the center and the bright lights 53 and 54, could be to the left and to the right of center, respectively. Light diffusion from the optical fiber 23, from the right would indicate a tilt to the level to the right and so on.

However, another embodiment could be the use of three fiber optic stems (or light sources) with the two on the outside being of different color(s) from the center one. This would provide two bright fields 53 and 54, on either side of the center and thus verify that the object is in fact level, again without directly looking at the level. Or in the case of a sensor, it could be programmed to translate the position indications of all of the optic possibilities with resultant corrections.

Figure 6:
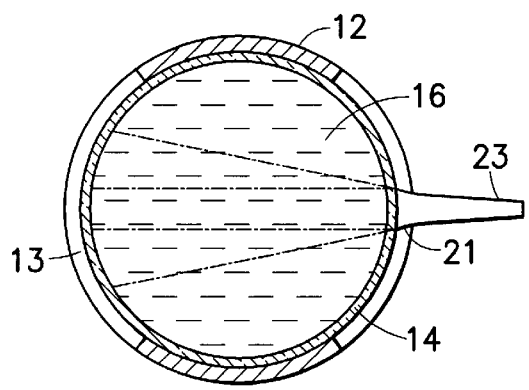
FIGS. 6 and 7, illustrate the optics of this invention.
Figure 7:
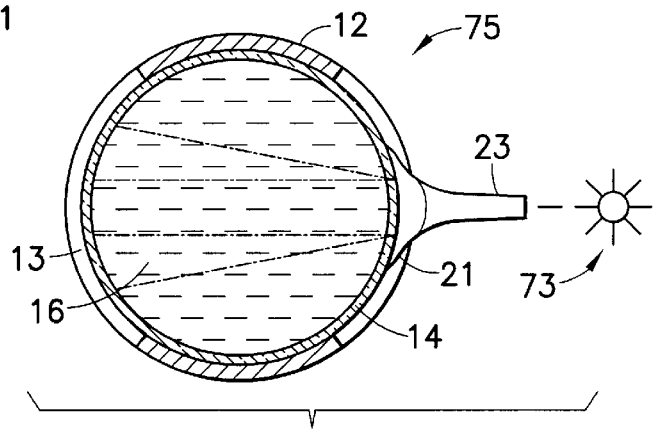

FIGS. 6 and 7, illustrate the optics of this invention, using still another embodiment of this invention, where one could use at least one light source 73, such as, a diode 73, in place of or in conjunction with a fluorescent fiber optic 23. This would provide the function of the invention with the use of an artificial light source.

Yet another implementation could be a standard fiber optic (non-fluorescent) 23, with an artificial light source 73.

It should be understood that the stem of the optical fiber is needed as a light absorption instrument for the dot to be visible through the liquid. However, the stem can be straight or it can be bent or could be adhered to the contours of the level.

There are a number of ways to secure the fiber optic to the see-through container 13. One would be to merely cut the fiber optic and place and secure the light transmitting end against the spirit level glass or the see-through container 13. However, this would not provide the optimum efficiency in transmitting the available light through the optical fiber.

It is preferred that one end of the fiber optic strand is heated to form a mushroom like expansion. This mushroom expansion can double or triple the cross-sectional size of the original diameter of the fiber optic. However, the mushrooming effect of the fiber optic curvature could be counter to the curvature of the spirit level glass or container 13. Therefore, it is preferred that the heated fiber optic, while in a softened, pliable state be pressed against the surface of the glass or see-through container where it is to be placed, so that it creates a mirror image surface. This will allow the fiber optic to take on and match the curvature of the glass capsule or see-through container 13.

The surface of the see-through container and the compatible fiber optic, preferably having a mushroom like contoured surface, is then prepped with an appropriate adhesive, such as "Crazy Glue", which is immediately followed by the contact of the softened mushroomed end of the fiber optic, the shaping and permanent adhesion are then accomplished in a single step.

Additional glass surface preparation could be the etching or roughing up of the glass to enhance the adhesion properties of the two surfaces when being glued or secured to each other. Attaching the fiber optic could vary from a permanent attachment to one with a capability for removal or replacement.

This invention preferably uses a fluorescent fiber optic which gathers available light but is placed in such a way that it serves as an indicator for the proper position of the level.

For some applications the capsule 13, having at least a portion that is transparent or see-through, could itself be the leveling device 25.

Similarly, for some applications the capsule 13, could either internally (not shown) or externally have a portion or area that is reflective, such as, a portion of the housing 12, to further enhance the viewing of the bubble 18.

As stated earlier that the leveling device 25, has at least one fiber optic piece, and wherein the fiber optic piece could be selected from a group comprising a fiber optic disc, a fiber optic strand, to name a few. However, it should be understood that the fiber optic piece could be of a fluorescent material.

It is preferred that the leveling device 25, having at least one see-through container 16, is peripherally secured to at least one housing 12. However, the housing 12, could have at least one illuminating device 73, peripherally secured to it or could be in the vicinity, and wherein the illuminating device 73, could be selected from a group comprising a light emitting diode, an incandescent bulb, a fluorescent bulb, to name a few. The illuminating device 73, could be energizeable from at least one external electrical battery, and wherein the external electrical battery could be rechargeable.

This leveling device would be of interest to any number of spirit level manufacturers. Similarly, manufacturers of gun sights or archery sights where levels are an integral part of the sighting device, could also use this invention.

Figure 8:
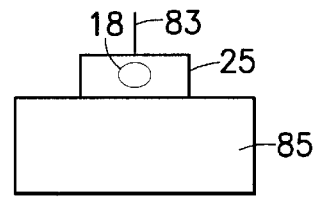
FIG. 8, illustrates yet another embodiment of this invention.

FIG. 8, illustrates yet another embodiment of this invention. The inventive level 25, could be secured to a surface of a fixture 85. The fixture 85, could be a surface of a computer that needs levelling, an archery bow, a gun, to name a few. One could also have a sight or pointer 83, to work with the fixture 85, to ensure that the item to be level is properly levelled.

As stated earlier that the leveling device 25, could be used by itself or the leveling device 25, could be secured to at least one fixture 85. The fixture 85, could be selected from a group comprising an altimeter, an archery bow, an artillery equipment, an automobile headlight, a carpenter's level, a computer, a gun, an octant, a sextant, to name a few.

As a leveling device for say a gun sight, an archery sight or as attached to any fixture, it could be used as an indicator of something at true level, i.e., 100 percent parallel or perpendicular to a reference plane. Or in another embodiment it could be used as an indicator of a desired cant, i.e., that the object is consistently at a 10° or 23° angle to a reference plane. An example, could be if a shooter wishes to cant a rifle or bow to a consistent 5° angle, the level indicator could be adjusted accordingly so that the fiber optic gives an off-cant indicator when the object is not at a 5° cant.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A leveling device, comprising:
   (a) at least one see-through container containing at least one fluid and having a bubble, and
   (b) at least one fiber optic piece secured to said at least one see-through container, such that at least a portion of said bubble visually overlaps said fiber optic piece when a predetermined level condition is obtained, wherein said bubble changes the characteristics of transmitted light when at least a portion of said bubble and at least a portion of said at least one fiber optic piece overlap.

2. The leveling device of claim 1, wherein said at least one see-through container is made from a material selected from a group consisting of glass, plastic plexiglass and polyvinylchloride.

3. The leveling device of claim 1, wherein said at least one fluid is selected from a group consisting of alcohol, ethylene glycol, spirit and water.

4. The leveling device of claim 1, wherein at least one dye gives said at least one fluid a color.

5. The leveling device of claim 1, wherein at least one housing peripherally secures said at least one see-through container.

6. The leveling device of claim 5, wherein said at least one housing has at least one illuminating device peripherally secured to it.

7. The leveling device of claim 5, wherein said at least one housing has at least one illuminating device peripherally secured to it, and wherein said at least one illuminating device is selected from a group consisting of light emitting diode, an incandescent bulb and a fluorescent bulb.

8. The leveling device of claim 5, wherein said at least one housing has at least one illuminating device peripherally secured to it, and wherein said at least one illuminating device is energized from at least one external electrical battery.

9. The leveling device of claim 8, wherein at least one of said at least one external electrical battery is rechargeable.

10. The leveling device of claim 5, wherein at least one lens is secured to said at least one housing.

11. The leveling device of claim 1, wherein said at least one fiber optic piece is secured to a surface of said at least one see-through container.

12. The leveling device of claim 1, wherein at least one reflective material is secured to a surface of said at least one see-through container.

13. The leveling device of claim 1, wherein said at least one fiber optic piece penetrates a surface of said at least one see-through container.

14. The leveling device of claim 1, wherein said at least one fiber optic piece is selected from a group consisting of a fiber optic disc and fiber optic strand.

15. The leveling device of claim 1, wherein said at least one fiber optic piece is of a fluorescent material.

16. The leveling device of claim 1, wherein said at least one see-through container contains at least one gas bubble.

17. The leveling device of claim 1, wherein said at least one see-through container contains at least one gas bubble, and wherein said gas bubble is selected from a group consisting of air, argon, carbon dioxide, helium, neon or nitrogen.

18. The leveling device of claim 1, wherein said level is secured to at least one fixture.

19. The leveling device of claim 1, wherein said level is secured to at least one fixture, and wherein said fixture is selected from a group consisting of an altimeter, an archery bow, an artillery equipment, an automobile headlight, a carpenter's level, a computer, a gun, an octant and a sextant.

20. A method of making a leveling device, comprising securing at least one fiber optic piece to at least one see-through container containing at least one fluid, said fluid having a bubble, such that at least a portion of said bubble visually overlaps said fiber optic piece when a predetermined level condition is obtained, wherein said bubble changes the characteristics of transmitted light when at least a portion of said bubble and at least a portion of said at least one fiber optic piece overlap.

21. The method of claim 20, wherein said at least one see-through container is made from a material selected from a group consisting of glass, plastic plexiglass and polyvinylchloride.

22. The method of claim 20, wherein said at least one fluid is selected from a group consisting of alcohol, ethylene glycol, spirit and water.

23. The method of claim 20, wherein at least one dye gives said at least one fluid a color.

24. The method of claim 20, wherein at least one housing peripherally secures said at least one see-through container.

25. The method of claim 24, wherein said at least one housing has at least one illuminating device peripherally secured to it.

26. The method of claim 24, wherein said at least one housing has at least one illuminating device peripherally secured to it, and wherein said at least one illuminating device is selected from a group consisting of light emitting diode, an incandescent bulb and a fluorescent bulb.

27. The method of claim 24, wherein said at least one housing has at least one illuminating device peripherally secured to it, and wherein said at least one illuminating device is energized from at least one external electrical battery.

28. The method of claim 27, wherein at least one of said at least one external electrical battery is rechargeable.

29. The method of claim 24, wherein at least one lens is secured to said at least one housing.

30. The method of claim 20, wherein said at least one fiber optic piece is secured to a surface of said at least one see-through container.

31. The method of claim 20, wherein at least one reflective material is secured to a surface of said at least one see-through container.

32. The method of claim 20, wherein said at least one fiber optic piece penetrates a surface of said at least one see-through container.

33. The method of claim 20, wherein said at least one fiber optic piece is selected from a group consisting of a fiber optic disc and fiber optic strand.

34. The method of claim 20, wherein said at least one fiber optic piece is of a fluorescent material.

35. The method of claim 20, wherein said at least one see-through container contains at least one gas bubble.

36. The method of claim 20, wherein said at least one see-through container contains at least one gas bubble, and wherein said gas bubble is selected from a group consisting of air, argon, carbon dioxide, helium, neon or nitrogen.

37. The method of claim 20, wherein said level is secured to at least one fixture.

38. The method of claim 20, wherein said level is secured to at least one fixture, and wherein said fixture is selected from a group consisting of an altimeter, an archery bow, an artillery equipment, an automobile headlight, a carpenter's level, a computer, a gun, an octant and a sextant.

* * * * *